United States Patent
Boismier et al.

(10) Patent No.: US 6,501,625 B1
(45) Date of Patent: Dec. 31, 2002

(54) DISK DRIVE SUSPENSION WITH MULTI-LAYERED PIEZOELECTRIC ACTUATOR CONTROLLED GRAM LOAD

(75) Inventors: Dennis A. Boismier, Shorewood, MN (US); Jason R. Heffelfinger, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 09/342,931

(22) Filed: Jun. 29, 1999

(51) Int. Cl.[7] .............................. G11B 5/56; G11B 21/24
(52) U.S. Cl. .................................................... 360/294.7
(58) Field of Search ........................... 360/294.4, 294.7, 360/294.5, 294.6

(56) References Cited

U.S. PATENT DOCUMENTS

| 4,146,911 A | 3/1979 | Gyi et al. |
| 4,605,977 A | 8/1986 | Mattews |
| 4,625,137 A | 11/1986 | Tomono |

(List continued on next page.)

FOREIGN PATENT DOCUMENTS

| DE | 198 16 909 | 11/1998 |
| EP | 0 886 264 | 12/1998 |
| JP | 9-288812 | 11/1997 |
| JP | 9-289342 | 11/1997 |
| JP | 10-283621 | 10/1998 |
| JP | 2000-348456 | 12/2000 |
| SU | 445062 | 10/1974 |
| WO | WO 98/20486 | 5/1989 |
| WO | WO 97/39447 | 10/1997 |
| WO | WO 98/19304 | 5/1998 |
| WO | WO 98/27547 | 6/1998 |
| WO | WO 98/37552 | 8/1998 |
| WO | WO 99/06993 | 2/1999 |

OTHER PUBLICATIONS

Piezoelectric Microactuator Compensating for Off–Track Errors in Magnetic Disk Drives, Imamura et al. Advanced Information Storage Systems, vol. 5, p. 119–126 (1993).
Microactuation White Paper, Robert Evans, Jason Griesbach and Peter Carlson, Sep. 3, 1998.
Dynamic Head/Suspension Assembly Preload Adjustment, Research Disclosure, Jun. 1986, No. 26655 © Kenneth Mason Publications Ltd., England.

Primary Examiner—Craig A. Renner
(74) Attorney, Agent, or Firm—Faegre & Benson LLP

(57) ABSTRACT

A method and apparatus for actively controlling the gram load on a disk drive suspension assembly and to a disk drive using the present disk drive suspension assembly. The gram load can be actively changed by changing the applied voltage to one or more multi-layer piezoelectric actuators attached to the head suspension. The active gram control system allows the gram load to be changed on a non-permanent basis and to control the gram load to a much finer scale than can be accomplished using conventional techniques. The disk drive suspension that uses a piezoelectric actuator having two or more layers. Each layer of the multi-layer piezoelectric actuator is poled in such a fashion that when energized, some piezoelectric layers contract while others expand, resulting in a curling motion. By attaching the first and second ends of the piezoelectric actuator to discrete locations on the load beam, while the portion of the piezoelectric actuator between the first and second ends remains unattached to the load beam, a force non-parallel to the load beam can be applied to the head suspension.

18 Claims, 8 Drawing Sheets

U.S. PATENT DOCUMENTS

| | | |
|---|---|---|
| 4,651,242 A | 3/1987 | Hirano et al. |
| 4,805,057 A | 2/1989 | Ogawa et al. |
| 4,843,502 A | 6/1989 | Tagawa |
| 4,853,810 A | 8/1989 | Pohl et al. |
| 4,858,040 A | 8/1989 | Hazebrouck |
| 5,012,369 A | 4/1991 | Owe et al. |
| 5,068,841 A | 11/1991 | Nakayama et al. |
| 5,079,652 A | 1/1992 | Ishida et al. |
| 5,189,578 A | 2/1993 | Mori et al. |
| 5,233,256 A | 8/1993 | Hayashi et al. |
| 5,255,135 A | 10/1993 | Itoh et al. |
| 5,285,338 A | 2/1994 | Sugahara et al. |
| 5,305,294 A | 4/1994 | Kime et al. |
| 5,373,213 A | 12/1994 | Smith |
| 5,377,058 A | 12/1994 | Good et al. |
| 5,384,675 A | 1/1995 | Crawforth et al. |
| 5,390,949 A | 2/1995 | Naganathan et al. |
| 5,392,173 A | 2/1995 | Kinoshita et al. |
| 5,394,281 A | 2/1995 | Kajitani |
| 5,408,376 A | 4/1995 | Nishikura et al. |
| 5,423,207 A | 6/1995 | Flechsig et al. |
| 5,446,612 A | 8/1995 | Thornton et al. |
| 5,477,404 A | 12/1995 | Kozaki |
| 5,719,720 A | 2/1998 | Lee |
| 5,764,444 A | 6/1998 | Imamura et al. |
| 5,796,558 A | 8/1998 | Hanrahan et al. |
| 5,801,505 A | 9/1998 | Lee et al. |
| 5,801,906 A | 9/1998 | Yanagisawa et al. |
| 5,802,701 A | 9/1998 | Fontana et al. |
| 5,825,590 A | 10/1998 | Ohwe |
| 5,898,541 A | 4/1999 | Boutaghou et al. |
| 5,991,114 A | 11/1999 | Huang et al. |
| 6,108,175 A | 8/2000 | Hawwa et al. |
| 6,134,087 A * | 10/2000 | Khan et al. ............... 360/294.6 |
| 6,157,522 A * | 12/2000 | Murphy et al. ........... 360/294.4 |
| 6,166,874 A | 12/2000 | Kim |
| 6,222,706 B1 * | 4/2001 | Stefansky et al. ........ 360/294.5 |
| 6,268,983 B1 * | 7/2001 | Imada et al. .............. 360/294.4 |
| 6,278,587 B1 * | 8/2001 | Mei et al. ................. 360/294.6 |

* cited by examiner

DISK DRIVE SUSPENSION WITH MULTI-LAYERED PIEZOELECTRIC ACTUATOR CONTROLLED GRAM LOAD

FIELD OF THE INVENTION

The present invention relates to a method and apparatus for actively controlling the gram load on a disk drive suspension assembly and a disk drive using the present disk drive suspension assembly.

BACKGROUND OF THE INVENTION

Head suspension assemblies are commonly used in rigid magnetic disk drives to support magnetic heads in close proximity to the rotating disk surfaces. Head suspension assemblies of this type typically include an air bearing head slider assembly mounted to a suspension. The suspension includes a load beam having a mounting region on its proximal end and a gimbal or flexure on its distal end. When incorporated into a disk drive, the mounting region is mounted to an actuator or positioning arm, which supports the suspension assembly over the rotating disk. A baseplate is typically welded to the mounting region to increase the rigidity of the mounting region and to provide a mechanism for securely mounting the suspension assembly to the positioning arm.

The load beam is an elongated and often generally triangularly shaped member that includes a spring region adjacent to the mounting region, and a rigid region that extends from the spring region. The flexure can be manufactured as a separate member and welded to the distal end of the load beam, or formed as an integral member in the distal end of the load beam.

The air bearing head slider assembly contains a magnetic head and is typically bonded to the flexure by adhesive. The flexure allows the head slider assembly to move or "gimbal" (about rotational pitch and roll axes) with respect to the distal end of the load beam and thereby follow variations in the surface of the spinning disk. To enable the pivotal flexure movement, the surface of the flexure to which the head slider assembly is bonded is typically spaced from the adjacent surface of the load beam by structures known as load point dimples or formed offsets.

Suspensions are commonly manufactured by chemically etching flat or unformed load beam blanks from thin sheets of stainless steel. Flat and unformed flexure blanks are etched in a similar manner from sheets of stainless steel. During subsequent manufacturing operations, side rails, load point dimples and any other structures that extend upwardly or downwardly from the web or generally planar surface of the load beam are formed on the load beam blanks by mechanical bending procedures. Any dimples, offsets or other structures on the flexures requiring deformation of this type are formed in a similar manner. After forming, the flexures are welded to the distal end of the load beams. Baseplates are also welded to the suspensions following the forming operations.

The product of these etching, welding and forming operations are generally flat suspensions (i.e., the mounting region, spring region and rigid region of the load beam are generally coplanar and at the same height. During subsequent manufacturing operations, at least a portion of the spring region of the load beam is rolled around a curved mandrel or otherwise bent in such a manner as to plastically bend or permanently deform the spring region. The rolling operation imparts a curved shape to the spring region and causes the flexure to be offset from the mounting region when the suspension is in its unloaded or free state.

As noted above, the suspension supports the slider assembly over the magnetic disk. In one embodiment, air pressure at the surface of the spinning disk creates a positive pressure air bearing that causes the slider assembly to lift away from and "fly" over the disk surface. In another embodiment, a negative pressure air bearing pulls the slider assembly toward the disk surface. To counteract these hydrodynamic forces, the head suspension assembly is mounted to the disk drive with the suspension in a loaded state so the bent spring region of the suspension biases the head slider assembly either toward or away from the magnetic disk. The height at which the slider assembly flies over the disk surface is known as the "fly height." The force exerted by the suspension on the slider assembly when the slider assembly is at fly height is known as the "gram load."

By controlling the gram load of the head suspension, the force applied to the read/write head at a constant flying level can be determined. Current suspensions have a gram load that is determined by a bend radius in the suspension arm. The accuracy of this type of gram loading method is typically about +/−0.1 grams. Once bent into position, the suspension arm has no way of changing the gram load, unless subsequently bent or altered in a permanent way.

U.S. Pat. No. 5,898,541 (Boutaghou et al.) discloses a bi-morph piezoelectric bending motor mounted on the head slider. The bending motor cooperates with a tab surface on the flexure to rotate the slider.

U.S. Pat. No. 5,719,720 (Lee) discloses a load beam of a head suspension mechanism that has a non-load bearing, single layer of piezoelectric material on at least one surface of a resilient portion of the load beam. A controller apparatus provides a control signal to the piezoelectric material that induces expansion or contraction of the piezoelectric material to cause the load beam to raise the head slider from the surface in the disk drive. Since the piezoelectric material of the '720 patent is limited to compression and expansion forces, it must be attached directly to the surface of the load beam. Consequently, the compression or expansion of the single layer piezoelectric material occurs along the length of the load beam and must overcome the stiffness of the load beam to produce a bending or curving motion of the resilient portion of the load beam. That is, the forces generated by the compression or expansion of the piezoelectric material are parallel to the surface of the load beam. Directing the forces from the piezoelectric material parallel to the load beam limits the amount of deflection and load applied to the load beam.

BRIEF SUMMARY OF THE INVENTION

The present invention is directed to a method and apparatus for actively controlling the gram load on a disk drive suspension assembly and to a disk drive using the present head suspension. The gram load can be actively changed by changing the applied voltage to a multi-layer piezoelectric material attached to the head suspension. The active gram control system of the present invention allows the gram load to be changed on a non-permanent basis and to control the gram load to a much finer scale than can be accomplished using conventional techniques. The present active gram control system may also be used for active vibration damping, lifting the read/write head, a shock sensor, and for contact recording.

The present invention is directed to a disk drive suspension assembly that uses at least one piezoelectric actuator having two or more layers. In a two-layer embodiment, each layer of the multi-layer piezoelectric actuator is poled in such a fashion that when energized, one piezoelectric layer contracts while the other expands, resulting in a curling motion. In an embodiment with more than two layers, the piezoelectric actuator is poled to achieve a curling motion. By attaching the first and second ends of the piezoelectric actuator to discrete locations on the load beam, while the portion of the piezoelectric actuator between the first and second ends remains unattached to the load beam, a force that is non-parallel to the surface of the load beam can be applied to the head suspension. In one embodiment, the force is normal to the load beam.

In one embodiment, the load beam may include a compliant region located between the first and second attachment locations for the piezoelectric actuator. Consequently, the piezoelectric actuator in an unactuated state supports a portion of the gram load. By arranging the multi-layer piezoelectric to span across the compliant region, a greater range of motion and a greater range of gram loading can be achieved. Compliant region refers to a partial etch, a hole, a recess, a narrowing of the load beam, one or more lines of weakness extending generally laterally across load beam, or other features in the load beam that create a location of flexibility greater than elsewhere along the load beam.

The present invention is also directed to a disk drive using the present disk drive suspension assembly. The disk drive includes a rigid magnetic disk and a positioning arm attached to the actuator arm mounting region. The head mounting region on a distal end of the load beam includes at least one transducer head positioned opposite the rigid magnetic disk. The piezoelectric actuator has at least two layers. First and second ends of the piezoelectric actuator are attached to the load beam at first and second attachment locations, respectively, so that a force non-parallel to the load beam is applied to the head suspension in an actuated state. In one embodiment, the force is normal to the load beam.

The multi-layer piezoelectric actuator can be used to determine precisely the flying height of the read/write heads on the disk drive suspension. Moreover, the gram load can be changed with changing drive conditions. The multi-layer piezoelectric actuator can eliminate the need for an active head lifter and landing zones on the fixed disk, while protecting the read/write heads during periods of inactivity. Since the layers of the multi-layer act as both actuators and transducers, the various layers produce a voltage when deflected. In one embodiment, these voltages are extracted to dampen gram changing vibrations and deflections. In another embodiment, the extracted voltages can be actively counteracted to reduce gram changing vibrations.

The present invention is also directed to a method of making a disk drive suspension assembly in accordance with the present invention. A load beam is formed having a distal end, an actuator arm mounting region on a proximal end, a rigid region, and a spring region between the rigid region and actuator arm mounting region. A compliant region is formed in the load beam. A head mounting region is formed on a distal end of the load beam for receiving a transducer head. A piezoelectric actuator having at least two layers is assembled. First and second ends of the piezoelectric actuator are attached to first and second attachment locations on opposite sides of the compliant region of the load beam so that the piezoelectric actuator supports a portion of the gram load in an unactivated state. The method may include the step of applying a voltage to one at least one of the piezoelectric actuators to perform one or more of controlling the flying height of the head mounting region, modifying the gram load, raising or lowering the head mounting region, measuring vibrations and deflections of the load beam, dampening vibrations of the load beam, controlling attitude of the head mounting region, and applying a lateral force on the load beam.

DETAILED DESCRIPTION OF THE INVENTION

Figure 1:
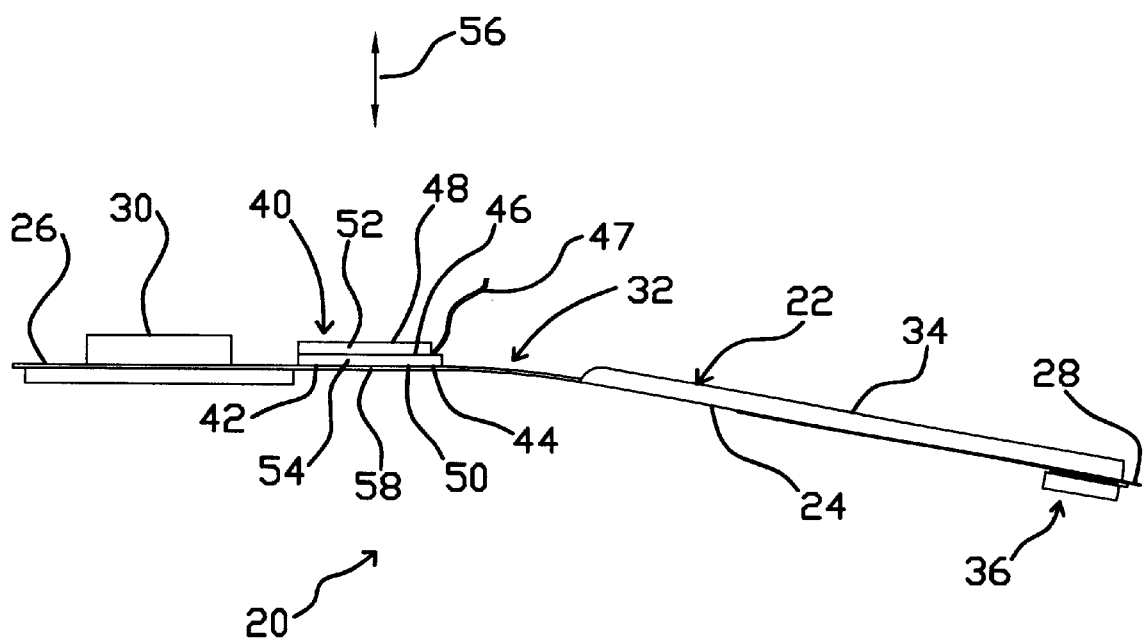
FIG. 1 is a schematic illustration of a disk drive suspension assembly in accordance with the present invention.
Figure 2:
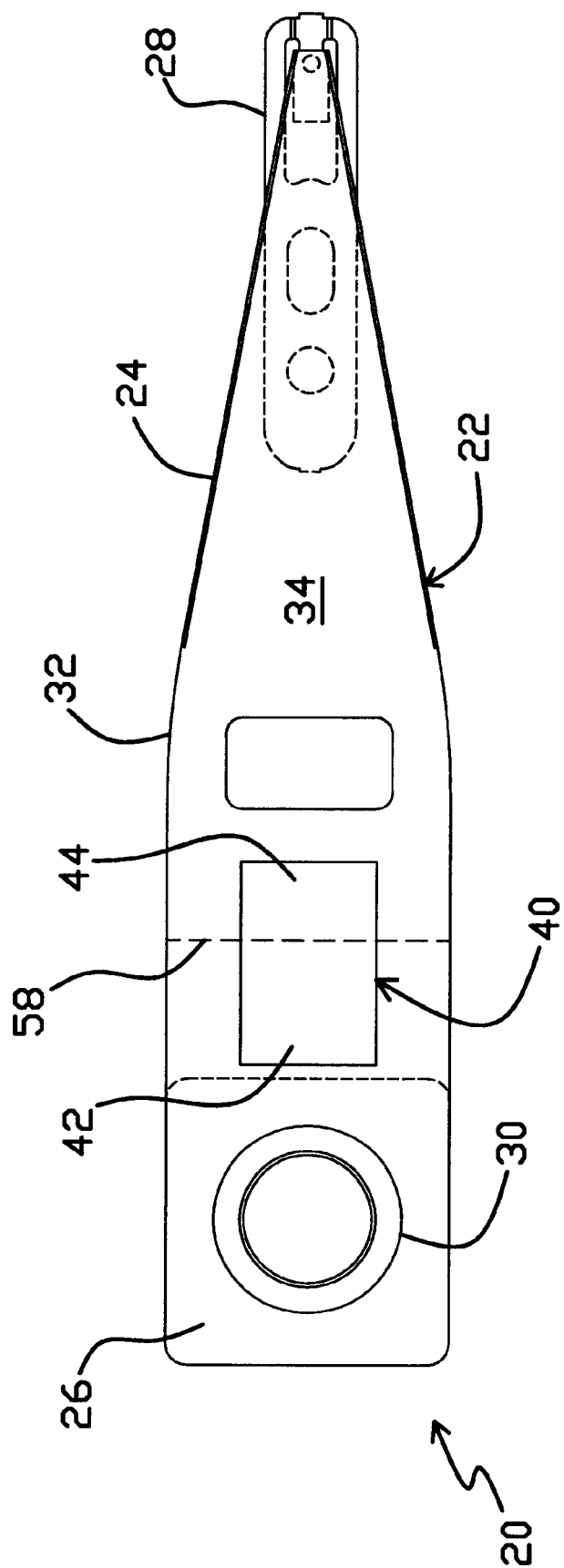
FIG. 2 is a top schematic illustration of the disk drive suspension of FIG. 1.

FIGS. 1 and 2 are side and top views of a disk drive suspension assembly 20 in accordance with the present invention. Head suspension 22 includes a load beam 24 having a mounting region 26 on its proximal end and a gimbal or flexure 28 on its distal end. A base plate 30 is typically welded to the mounting region 26 to increase the rigidity of the mounting region 26 and to provide a mechanism for securely mounting the disk drive suspension assembly 20 to an actuator or positioning arm 157 on a disk drive 150 (see FIG. 4). The load beam 24 is an elongated and often triangular shaped member that includes a spring region 32. Rigid region 34 is the portion of the load beam that extends between the spring region 32 and the distal end 36.

The mounting region 26 is typically rigid. In the illustrated embodiment, the mounting region 26 includes a compliant region 58. For gram control applications, the compliant region 58 is compliant in the z direction 56. For lateral control applications (see FIG. 3), the compliant region 58 is compliant in the x and y directions.

A multi-layer piezoelectric actuator 40 is mounted to the load beam 24 at first and second attachment locations 42, 44 using an adhesive. In one embodiment, the adhesive is conductive, such as an adhesive sold under the product designation XP 501, available from EMI Corporation of Breckenridge, Colo. The first and second attachment locations 42, 44 are positioned on opposite sides of the compliant region 58. In the illustrated embodiment, the first attachment location 42 is adjacent to the base plate 30, but does not touch the base plate 30 and the second attachment location 44 is adjacent to the spring region 32, but does not extend onto the spring region. The piezoelectric actuator 40 is not bonded to the load beam 24 between the attachment locations 42, 44.

In the illustrated embodiment, the multi-layer piezoelectric actuator 40 is a two-layer piezoelectric actuator with a middle electrode 46. The multi-layer piezoelectric actuator 40 illustrated in FIG. 1 is of a step construction. This construction allows electrical connection 47 to the middle electrode 46 to be bonded directly to lower piezoelectric element 54. A middle electrode that protrudes from one side of the multi-layer piezoelectric actuator 40 may also be used. Alternatively, one of the piezoelectric layers 52, 54 may include a hole for accessing the middle electrode 46.

An electric field can be applied to a piezoelectric actuator 40 to cause it to deform. Alternatively, when pressure is applied to the piezoelectric actuator 40, the actuator 40 generates an electric field in proportion to the pressure applied. That is, the piezoelectric actuator 40 has a reversible relationship between physical deformation and electric energy. The piezoelectric layers 52, 54 may be constructed from a variety of materials, such as lead zirconium titinate, polymers such as polyvinylidene fluoride (PVDF), or other piezoelectric or electrostrictive types of materials.

In the embodiment of FIG. 1, voltage is applied to the middle electrode layer 46, while the top and bottom surfaces 48, 50 are grounded, to create an actuated state. Each of two piezoelectric elements 52, 54 are poled in the same direction. When energized, one piezoelectric layer contracts, while the other expands. The curling motion occurs when the two piezoelectric elements 52, 54 exert opposite forces on each other. The resulting force is non-parallel to the surface of the load beam 24. In one embodiment, the force is normal to the load beam along the z-axis 56. The force can be either positive or negative. The gram load can be actively changed by changing the voltage applied. Alternatively, the middle electrode layer 46 is grounded and voltage is applied to the top and bottom surfaces 48, 50.

Due to the location of the compliant region 58, the piezoelectric actuator 40 in the unactuated state carries some fraction of the total gram load. That is, the piezoelectric actuator 40 contributes to the gram load of the suspension assembly 20 in an unactuated state. The unactuated state refers to zero voltage being applied across the piezoelectric actuator 40. Only the distal ends of the piezoelectric actuator 40 are adhered to the load beam 24 at locations 42, 44, so as to not inhibit the curling motion. The complaint region 58 is typically the weakest point on the load beam 24 between the attachment locations 42, 44. Consequently, when a voltage is applied to the piezoelectric actuator 40, the load beam 24 is bent or flexed primarily at the compliant region 58.

The size and shape of the piezoelectric actuator 40 can be changed to increase or decrease the range of gram load available for application to the disk drive suspension assembly 20. Also, the location, shape and/or depth of the compliant region 58 that is spanned by the piezoelectric actuator 40 can be changed to modify the percentage of the gram load carried by the piezoelectric actuator 40. The location of the piezoelectric actuator 40 and corresponding compliant region 58 can be located anywhere along the suspension assembly 20. In the illustrated embodiment, the stiffness of the base plate 30 provides the structure against which the piezoelectric actuator 40 acts in the actuated state.

Figure 1A:
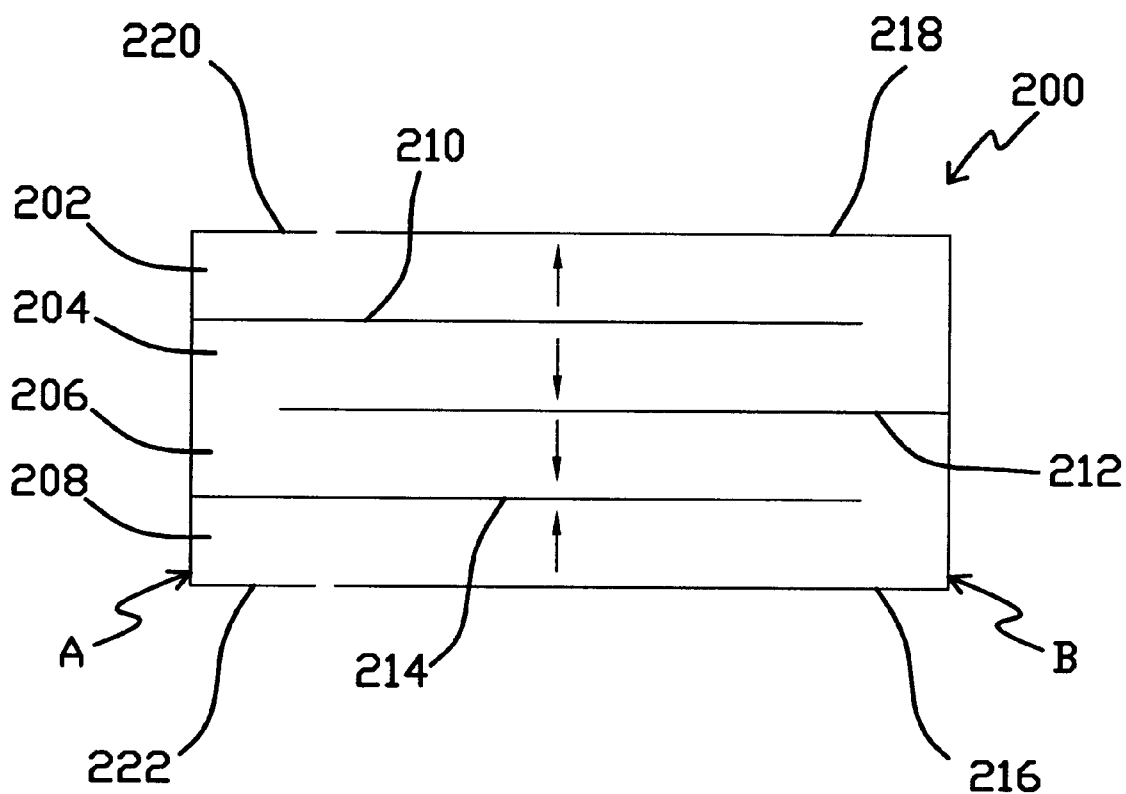
FIG. 1A is a sectional view of an alternate piezoelectric actuator in accordance with the present invention.

Piezoelectric actuators with more than two layers may also be used in the present invention, such as the bi-morph piezoelectric actuator shown in U.S. Pat. No. 5,898,541 (Boutaghou et al.). FIG. 1A is a cross sectional illustration of a piezoelectric actuator 200 with four layers 202, 204, 206 and 208. Electrode surfaces 210, 214, 220 and 222 form a first electrode A. Electrode surfaces 212, 216 and 218 form a second electrode B. The arrows indicate the direction of polarization. Electrode surface 220, 218 connected to electrodes A and B, respectively, partially extend across the top surface of the piezoelectric actuator 200. Electrode surface 222, 216 connected to electrodes A and B, respectively, partially extend across the bottom surface of the piezoelectric actuator 200. The ends of the layers 202, 204, 206 and 208 are covered by the electrodes A and B, but the sides are not. When electrodes A and B have a voltage differential, the top two layers 202, 204 will contract, while the bottom two layers 206, 208 will expand, or visa-versa, creating a curling motion.

Figure 2A:
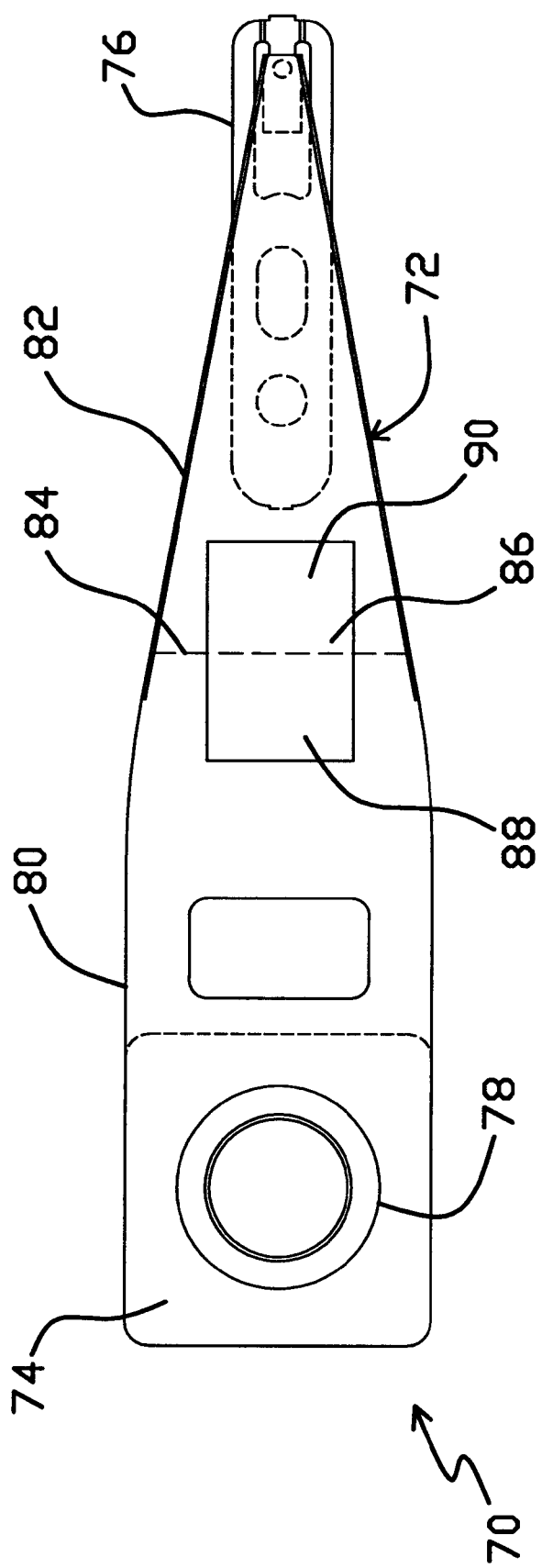
FIG. 2A is a top schematic illustration of an alternate disk drive suspension in accordance with the present invention.

FIG. 2A is a top view of an alternate disk drive suspension 70 in accordance with the present invention. The suspension 70 includes a load beam 72 having a mounting region 74 on its proximal end and a gimbal or flexure 76 on its distal end. A base plate 78 is welded to the mounting region 74. The load beam 72 is an elongated member that includes a spring region 80 and a rigid region 82 extending between the spring region 80 and the flexure 76. In the illustrated embodiment, a compliant region 84 is formed in the rigid region 82 between the spring region 80 and the flexure 76. A multi-layer piezoelectric actuator 86 is attached to the load beam 72 at first and second attachment locations 88, 90 using an adhesive. The first and second attachment locations 88, 90 are positioned on opposite sides of the compliant region 84. The piezoelectric actuator 86 is not bonded to the load beam 72 between the attachment locations 88, 90.

Figure 3:
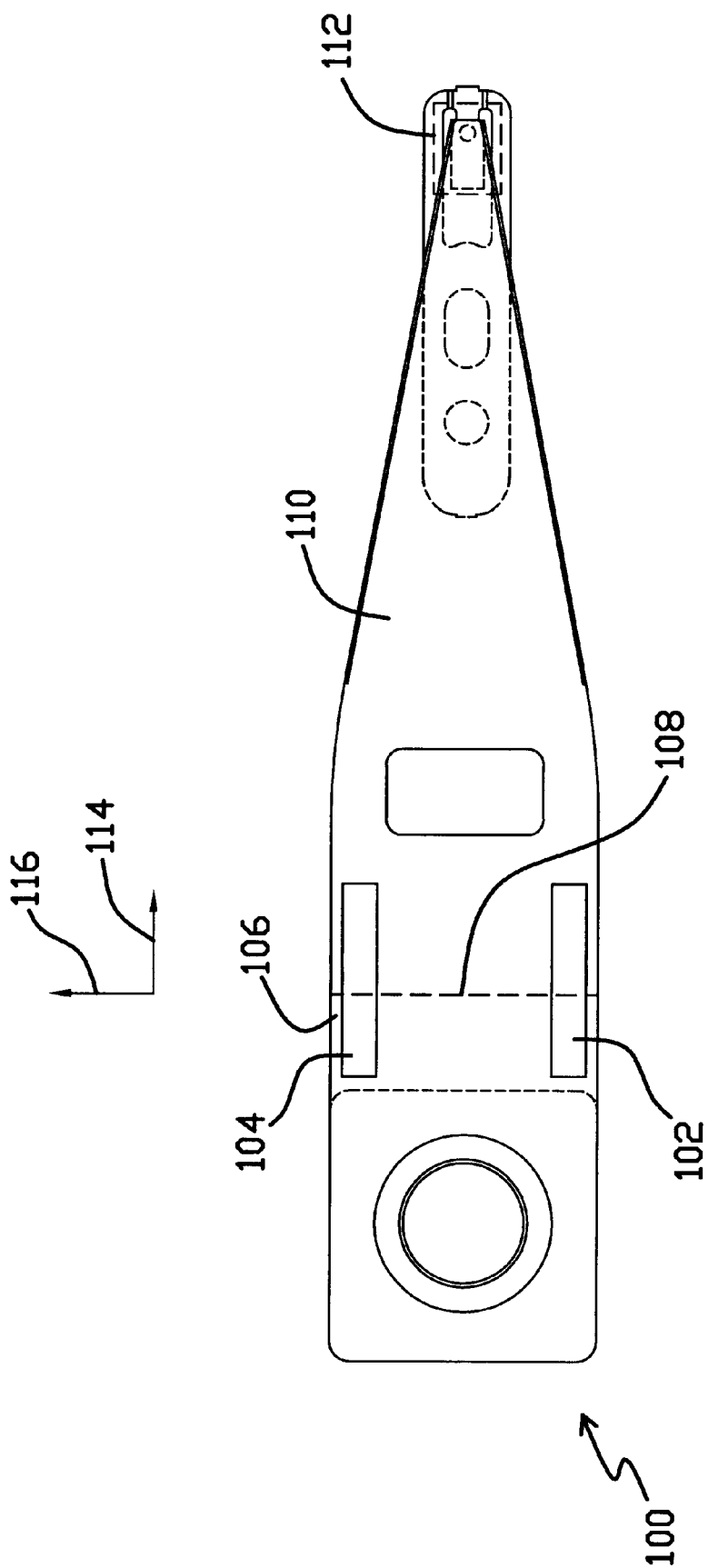
FIG. 3 is a top schematic illustration of an active attitude control suspension assembly in accordance with the present invention.

FIG. 3 is a schematic illustration of a disk drive suspension 100 having a pair of multi-layer piezoelectric elements 102, 104 that provide active attitude control. The piezoelectric actuators 102, 104 are mounted along the edges of the spring region 106 and extend over or span a compliant region 108. In the illustrated embodiment, the attachment locations of the piezoelectric actuator 102 are coplanar with the attachment locations of the piezoelectric actuator 104. By selectively actuating one or both of the piezoelectric actuators 102, 104, and/or activating them in opposite directions, a torque can be applied to the load beam 110. The active attitude control provided by the piezoelectric actuators 102, 104 permits different rotational forces on the read/write head on flexure 112, thus allowing for partial control of static attitude.

For example, the disk drive suspension 100 may be used for lateral actuation by applying a voltage to the piezoelectric actuators 102, 104. By having one of the actuators 102 expand and the other actuator 104 contract, or visa versa, lateral motion of the read/write head 112 can be generated along the x-axis 114 and the y-axis 116. The actuators 102, 104 may also be used for controlling the gram forces on the suspension 100.

Figure 4:
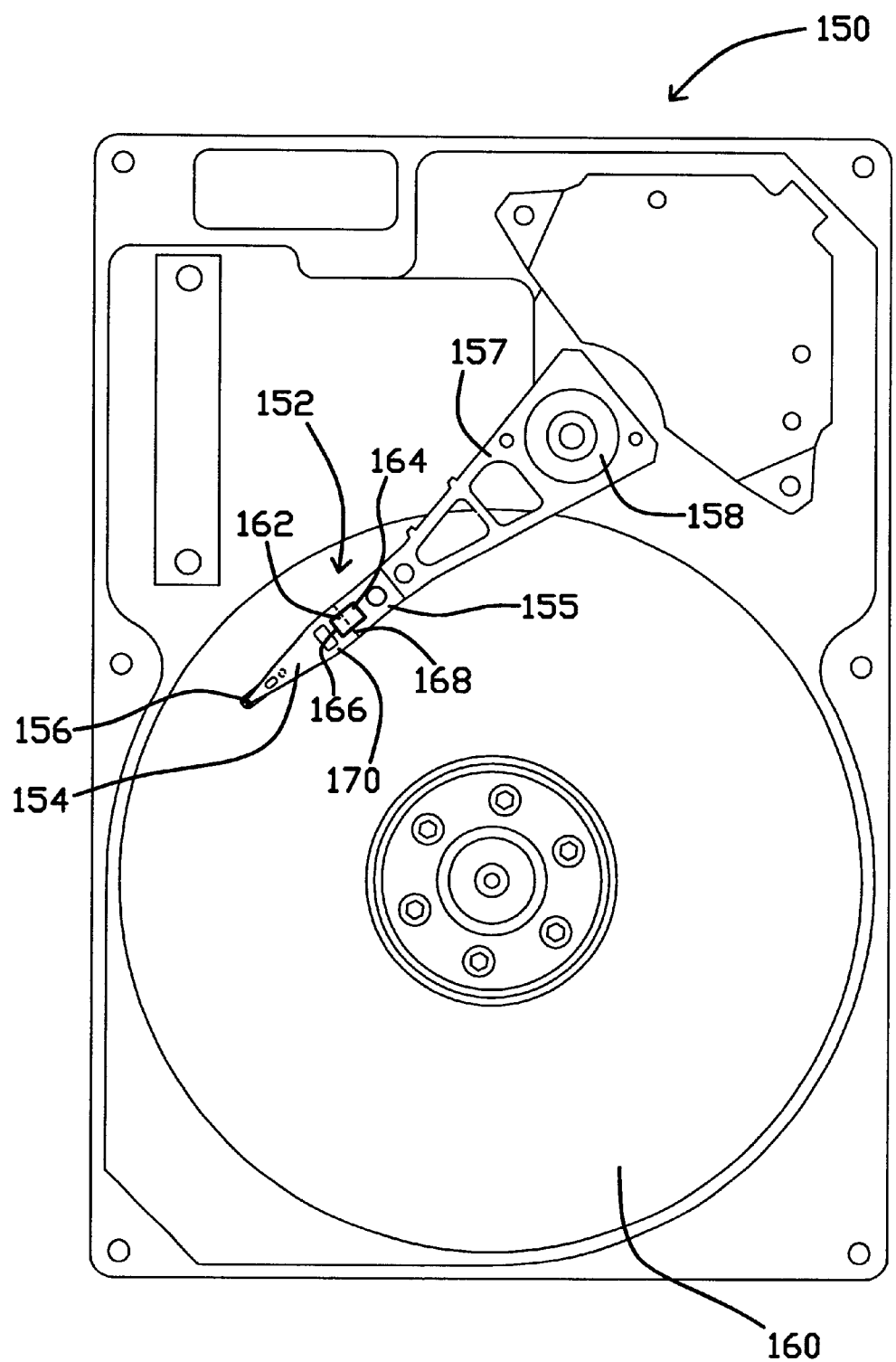
FIG. 4 is a top schematic illustration of disk drive in accordance with the present invention.

FIG. 4 is a schematic illustration of a rigid magnetic disk drive 150 in accordance with the present invention. Head suspension assembly 152 includes a load beam 154 with magnetic heads and a flexure 156 at a distal end and a mounting region 155 attached to an actuator arm 157. The proximal end of the head suspension assembly 152 is mounted to a rotary actuator 158. The head suspension assembly 152 positions the magnetic heads and flexure 156 in close proximity to a rotating disk 160. A multi-layer piezoelectric actuator 162 is attached to the load beam 154 at attachment locations 164, 166 positioned between the spring region 170 and the mounting region 155. In one embodiment, a compliant region 168 is formed in the load beam 154 between the attachment locations 164, 166 to form a load bearing piezoelectric actuator.

The multi-layer piezoelectric actuator 162 can be used to determine and/or precisely control the flying height of the read/write heads 156 over the rotating disk 160 on a real-time basis. In another embodiment, the gram load of the head suspension assembly 152 can be changed real-time with changing drive conditions. The multi-layer piezoelectric actuator 162 can eliminate the need for an active head lifter and landing zones on the rotating disk 160, while protecting the read/write heads 156 during periods of inactivity. Since the layers of the multi-layer piezoelectric actuator 162 act as both actuators and transducers, the various layers produce a voltage when deflected. Extracting these voltages reduces the energy in the assembly 152 and dampens vibrations and deflections. In another embodiment, the extracted voltages are used to quantify the vibrations and a corresponding voltage is applied to the actuator 162 to actively dampen vibrations. Various electronic control circuits for controlling the piezoelectric actuator 162 to perform the functions discussed herein are disclosed in U.S. Pat. No. 5,377,058 (Good et al.); 5,719,720 (Lee); and U.S. Pat. No. 5,802,701 (Fontana et al.).

Construction of an Active Gram Control Suspension Load Bearing, Multi-Layer Piezoelectric Actuator A head suspension was constructed with a load bearing, multi-layer piezoelectric actuator in accordance with the present invention. The head suspension was constructed from a Magnum 5 head suspension available from Hutchinson Technology Inc. located in Hutchinson, Minn. The piezoelectric material used for the piezoelectric actuator was obtained from Motorola Corporation in Albuquerque, N.Mex. under the product designation 3203HD.

Pieces of the piezoelectric about 0.125 millimeters (mm) thick were cut into pieces about 2.25 mm wide and about 10.5 mm long using the dicing saw. The Motorola 3203HD material had Au electrode material on both sides. The pieces were then shortened using a diamond scribe to lengths of approximately 5 mm to about 7 mm. Pieces of the piezoelectric with different lengths were bonded together using EMI XP 501 conductive epoxy, available from EMI Corporation of Breckenridge, Colo. The epoxy was cured in an ultra-clean oven at about 145 degrees ° C. for about 5 minutes. The poling direction of each piezoelectric layer was kept in the same direction for their construction.

The Magnum 5 head suspension has an etched region in the load beam that forms a compliant region. The distal ends of the load bearing, multi-layer piezoelectric actuator were attached to the head suspension using EMI XP 501 conductive epoxy. The attachment locations were near the base plate and on the opposite side of an etched region. By spanning the etched region, the multi-layer piezoelectric actuator provided a portion of the gram load for the head suspension. The piezoelectric actuator was arranged so that the longer piece of piezoelectric material was bonded to the load beam, with the stepped surface located away from the base plate (see for example FIG. 1). The bonds were approximately 0.4 mm in length and extended the width of the piezoelectric actuator (2.25 mm). The region between the attachment locations was not bonded to the head suspension. The epoxy was cured for 5 minutes at 145° C. in the ultra-clean oven.

Non-Load Bearing Multi-Layer Piezoelectric Actuator

Using the procedure and materials discussed above, a head suspension with a non-load bearing multi-layer piezoelectric actuator was constructed. For this design, the piezoelectric material was cut into pieces approximately 3 mm and 5 mm in length. The multi-layer piezoelectric actuator was attached to a Magnum 5 head suspension using the conductive epoxy. The attachment locations were near the base plate and adjacent to the side of the etched region closest to the base plate. The piezoelectric actuator did not span the partial etched region of the Magnum 5 suspension and did not provided any support to the etched region. The bonds were approximately 0.4 mm in length and extended the width of the piezoelectric actuator (2.25 mm).

Load Bearing Single Layer Piezoelectric Actuator

Using the procedure and materials discussed above, a head suspension with a load bearing, single layer piezoelectric actuator was constructed. Only one piece of piezoelectric material, approximately 7 mm long, was bonded to the Magnum 5 suspension. Conductive epoxy was use to bond the piezoelectric actuator to areas on both sides of the partial etch region. Larger areas of conductive adhesive, approximately 2 mm in length and 2.25 mm in width were applied to the load beam.

Testing of the Head Suspensions

The head suspensions were tested for gram control and gram range using an EK120 load cell, available from Berne Scale, Minneapolis, Minn. The load cell was sensitive to 0.01 grams. Load was applied to the head suspensions using an ORIEL Model 18011 Encoder Mike Controller and an ORIEL Encoder Mike stepping motor. The gram load fixture was somewhat affected by external noise, vibrations and air flow. The measured gram load reading was observed to drift by 0.02–0.03 grams with time and/or external perturbation.

For the test, the head suspensions were loaded with approximately two grams. Voltage to the piezoelectric actuator was supplied by a Keithley 2400 source meter. Electrical connections to the piezoelectric actuator were made using soldered on wires.

Example 1

Example 1 examined the gram load to applied voltage for the head suspension with the load bearing, multi-layer piezoelectric actuator.

The wires were soldered to the top surface and the stepped surface of the piezoelectric actuator. The base of the suspension and the top surface of the piezoelectric actuator were grounded, and voltage was supplied to the stepped middle electrode.

Figure 5:
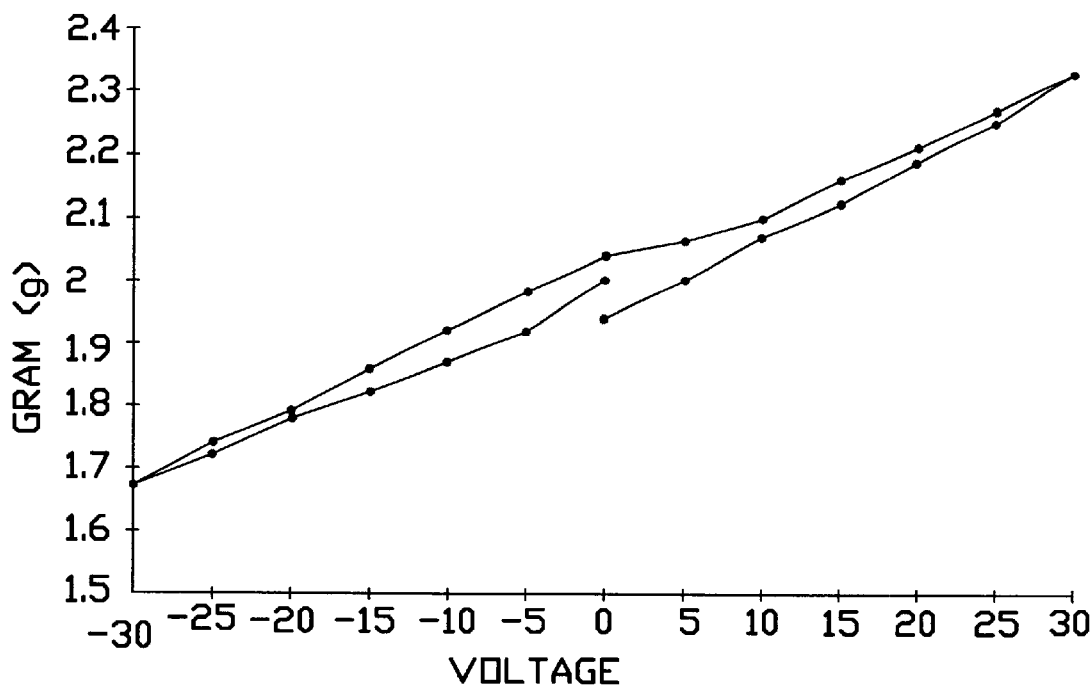
FIG. 5 is a graph of gram load versus voltage for one embodiment of the disk drive suspension assembly of the present invention.

Voltage to the piezoelectric actuator was applied in 5 volt increments. In the first test, the voltage was applied from zero to +30 volts and then stepped to −30 volts and back to 0 volts. At each 5 volt increment, the gram was recorded. FIG. 5 shows a graph of the measured gram load versus applied voltage with a gram load ranging between about 1.67 grams and about 2.33 grams. The sensitivity of the gram-to-voltage calculated from the slope of the curve is 0.011 grams/volt.

Example 2

Example 2 examined the gram load to applied voltage for the head suspension with the load bearing, multi-layer piezoelectric actuator.

Figure 6:
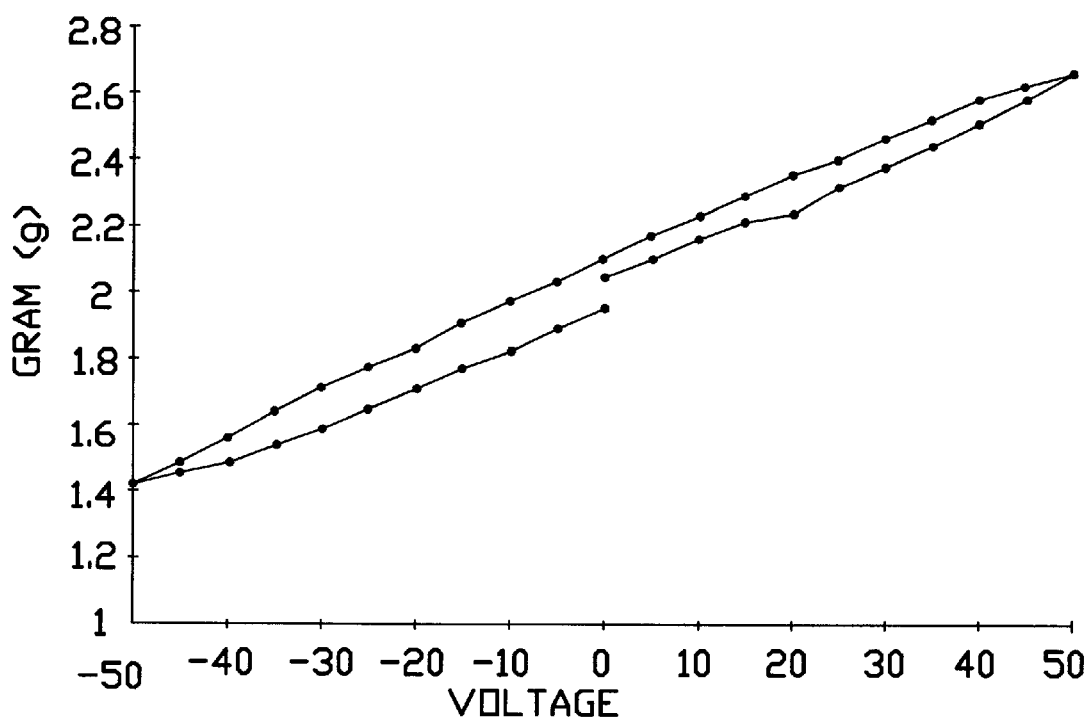
FIG. 6 is a graph of gram load versus voltage for another embodiment of the disk drive suspension assembly of the present invention.

Voltage to the piezoelectric actuator was applied in 5 volt increments. In the second test the voltage was applied from zero to +50 volts and then stepped to −50 volts. At each 5 volt increment, the gram load was recorded. FIG. 6 shows a graph of the measured gram versus applied voltage with a gram load ranging between about 1.42 grams and about 2.66 grams. The sensitivity of the gram-to-voltage calculated from the slope of the curve is 0.0124 grams/volt. The sensitivity of gram load-to-voltage is dependent on the piezoelectric actuator and suspension design. A head suspension could be designed for a particular sensitivity.

FIGS. 5 and 6 show some hysteresis in the curves of gram load versus applied voltage. Hysteresis is inherent in some piezoelectric materials. Use of a charge control system, instead of voltage control system, has the potential to reduce the hysteresis.

FIGS. 5 and 6 show the ability of the head suspension to control gram load with applied voltage. Depending on the magnitude of the voltage, a range of up to 1.24 grams (+/−50 volts) can be attained with the head suspension. A larger range of gram control could be achieved in several ways, such as increasing the applied voltage, using a wider actuator design, increasing the gram load carried by the actuator, and changing the location, shape and size of the actuator and/or the compliant region. Current Underwriter Laboratories specification 1950 for SELV Class II circuitry within hard disk drives limits the usable voltage to +/−30 volts.

Example 3

Example 3 examined the gram load and sensitivity of the head suspension with the load bearing, multi-layer piezoelectric actuator.

To determine the accuracy to which the gram load of the head suspension could be controlled, gram load levels of 1.75 grams and 2.25 grams were chosen as target values. To start the test, the nominal gram level was measured at 0 applied volts. Voltage was then slowly applied until the target gram load was met. The voltage at the target gram load was then recorded. Results of the test are shown in Table 1.

TABLE 1

| Target Gram Load | Gram Load at 0 Volts | Attained Gram Load | Applied Voltage |
| --- | --- | --- | --- |
| 1.75 grams | 2.03 grams | 1.75 grams | −26 volts |
| 2.25 grams | 2.05 grams | 2.25 grams | 21 volts |

Example 3 shows that the present head suspension can control the gram load to within 0.01 grams accuracy, or a factor of 10 more accurately than conventional gram loading techniques. Gram levels of 2.25 and 1.75 grams were achieved by simply increasing or decreasing the voltage until the gram load met the target values. The piezoelectric actuator should be able to control gram load as accurately as the input voltage is controlled. If the input voltage is accurate to within 1.0 volts, gram load on the head suspension should be controlled at increments of 0.01 grams. Potentially, the voltage could be controlled at a much finer resolution than 1.0 volts, and thus the gram control would be finer than 0.01 grams.

Example 4

Example 4 examined the gram load range and gram control for the three different head suspension having a load bearing, single layer actuator, a load bearing, multi-layer actuator and a non-load bearing, multi-layer actuator.

The base of the head suspension and the top surface of the multi-layer piezoelectric actuators were grounded, and voltage was supplied to the stepped multi-layer piezoelectric actuator surface. For the single layer piezoelectric actuator, the load beam was ground, and voltage was supplied to the top surface of the piezoelectric actuator.

Figure 7:
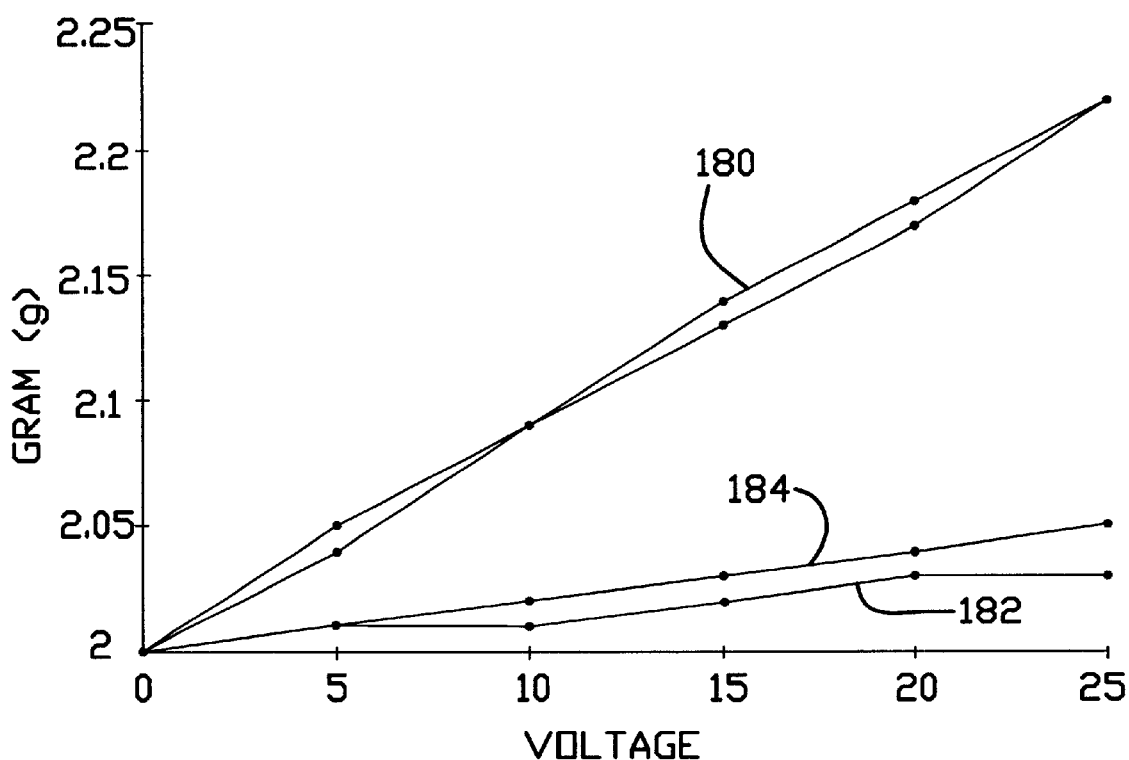
FIG. 7 is a graph of gram load versus voltage for various designs of disk drive suspension assemblies.

For each test, the suspension was loaded with approximately 2 grams of load. The voltage was stepped up in 5 volts increments to +25 volts, and the gram was recorded at each increment. The voltage was then stepped down to 0 volts in 5 volt increments, and the gram was recorded at each increment. FIG. 7 is a graph showing the measured gram with applied voltage for each of the tests.

Curve 180 of FIG. 7 shows the performance of the load-bearing, multi-layer piezoelectric actuator. As compared with the load-bearing, multi-layer piezoelectric actuator, the performance of the non-load bearing, multi-layer piezoelectric actuator shown in curve 182 was about one seventh the gram load range. The performance of the load bearing, single layer piezoelectric actuator shown in curve 184 was about one fourth the gram load range of the load bearing, multi-layer piezoelectric actuator.

Gram measurement tests were performed to determine the performance differences between gram control suspension that used either a load bearing multi-layer piezoelectric actuator, a non-load bearing multi-layer piezoelectric actuator or a load bearing, single layer piezoelectric actuator. A summary of the sensitivity data is provided in Table 2.

TABLE 2

| suspension type | voltage range | measured gram range | sensitivity |
| --- | --- | --- | --- |
| load-bearing, multi-layer piezoelectric actuator | 0 to +25 volts | 1.99 to 2.21 grams | 8.8 mg/v |
| non-load bearing, multi-layer piezoelectric actuator | 0 to +25 volts | 2.05 to 2.08 grams | 1.2 mg/v |
| load bearing, single layer piezoelectric actuator | 0 to +25 volts | 2.05 to 2.10 grams | 2.0 mg/v |

The data in Table 2 shows a significant improvement in gram control for the load-bearing, multi-layer piezoelectric actuator. The sensitivity of the load bearing, multi-layer piezoelectric actuator was four times greater than the load bearing, single layer piezoelectric actuator. This data also shows that allowing the actuator to bear part of the gram load was a significant factor in the performance of the active gram control suspension.

The load bearing, multi-layer piezoelectric actuator showed a significant improvement in control of gram forces over the load bearing, single layer piezoelectric actuator design. This improvement appears to be the result of the increased force that the multi-layer piezoelectric actuator can produce and the direction of that force. The load bearing, single layer piezoelectric actuator design limits the amount of change in gram load controlling forces. It is expected that non-load bearing, single layer piezoelectric actuators would perform even worse than the load bearing, single layer piezoelectric actuator due to the increase stiffness of the load beam.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A disk drive suspension assembly, comprising:
   a load beam having a distal end, an actuator arm mounting region on a proximal end, a rigid region, and a spring region between the rigid region and actuator arm mounting region;
   a head mounting region on a distal end of the load beam for receiving a transducer head; and
   at least one multi-layered piezoelectric actuator having at least two layers attached to each other along a common surface, the piezoelectric actuator having first and second ends attached to the load beam at first and second attachment locations, respectively, a portion of the piezoelectric actuator between the first and second ends remaining unattached to the load beam, so that a force out of a plane of the load beam is applied to the load beam in an actuated state.

2. The disk drive suspension assembly of claim 1 wherein the load beam includes a compliant region located between the first and second attachment locations so that the piezoelectric actuator supports a portion of a gram load in an unactuated state.

3. The disk drive suspension assembly of claim 2 wherein the compliant region is located between the spring region and the head mounting region.

4. The disk drive suspension assembly of claim 2 wherein the compliant region is located between the actuator arm mounting region and the spring region.

5. The disk drive suspension assembly of claim 1 wherein the load beam includes a compliant region located between the first and second attachment locations so that the piezoelectric actuator bends the load beam at the compliant region in an actuated state.

6. The disk drive suspension assembly of claim 1 wherein the first end of the piezoelectric actuator is attached adjacent to the actuator arm mounting region and the second end is attached adjacent to the spring region.

7. The disk drive suspension assembly of claim 1 wherein the piezoelectric actuator exhibits a curling motion when a voltage is applied.

8. The disk drive suspension assembly of claim 1 wherein the piezoelectric actuator is attached to the load beam with one of a conductive adhesive and a non-conductive adhesive.

9. The disk drive suspension assembly of claim 1 wherein a gram load is changed by applying a voltage to the piezoelectric actuator.

10. The disk drive suspension assembly of claim 1 wherein the force applied to the load beam alters a gram load with a resolution of about 0.01 grams or less.

11. The disk drive suspension assembly of claim 1 wherein the force is normal to the load beam.

12. The disk drive suspension assembly of claim 1 comprising a second piezoelectric actuator attached to the load beam at third and fourth attachment locations so that a force non-parallel to the load beam is applied to the load beam in an actuated state.

13. A disk drive suspension assembly, comprising:
   a load beam having a distal end, an actuator arm mounting region on a proximal end, a rigid region, and a spring region between the rigid region and actuator arm mounting region;
   a compliant region in the load beam;
   a head mounting region on a distal end of the load beam for receiving a transducer head; and
   at least one multi-layered piezoelectric actuator having at least two layers attached to each other along a common surface and poled such that when energized one layer contracts while the other expands, the piezoelectric actuator having first and second ends attached to the load beam at first and second attachment locations on opposite sides of the compliant region, respectively, a portion of the piezoelectric actuator between the first and second ends remaining unattached to the load beam, so that the piezoelectric actuator supports a portion of a gram load in an unactuated state and generates a force out of a plane of the load beam in an actuated state.

14. The disk drive suspension assembly of claim 13 wherein the compliant region is located between the spring region and the head mounting region.

15. The disk drive suspension assembly of claim 13 wherein the compliant region is located between the actuator arm mounting region and the spring region.

16. The disk drive suspension assembly of claim 13 wherein the piezoelectric actuator generates a force non-parallel to the load beam in an actuated state.

17. The disk drive suspension assembly of claim 13 comprising a second piezoelectric actuator attached to the load beam at third and fourth attachment locations, the third and fourth attachment locations being coplanar with the first and second attachment locations.

18. A disk drive comprising:
   a rigid magnetic disk,
   a load beam having a distal end, an actuator arm mounting region on a proximal end, a rigid region, and a spring region between the rigid region and actuator arm mounting region;
   a compliant region in the load beam;
   a positioning arm attached to the actuator arm mounting region;
   a head mounting region on a distal end of the load beam including at least one transducer head positioned opposite the rigid magnetic disk; and
   a multi-layered piezoelectric actuator having at least two layers attached to each other along a common surface and poled such that when energized one layer contracts while the other expands, the piezoelectric actuator having first and second ends attached to the load beam at first and second attachment locations on opposite sides of the compliant region, respectively, a portion of the piezoelectric actuator between the first and second ends remaining unattached to the load beam, so that the piezoelectric actuator supports a portion of a gram load in an unactuated state and generates a force out of a plane of the load beam in an actuated state.

* * * * *